US012644796B2

(12) United States Patent
Wang et al.

(10) Patent No.: US 12,644,796 B2
(45) Date of Patent: Jun. 2, 2026

(54) METHOD FOR EVENT DATA RECORDER TESTING AND APPARATUS THEREOF

(71) Applicant: INDUSTRIAL TECHNOLOGY RESEARCH INSTITUTE, Hsinchu (TW)

(72) Inventors: Yu-Long Wang, Hsinchu County (TW); Yu-Hung Hsueh, Hsinchu County (TW); Yung-Chen Wang, Kaohsiung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 295 days.

(21) Appl. No.: 18/641,476

(22) Filed: Apr. 22, 2024

(65) Prior Publication Data

US 2025/0327721 A1     Oct. 23, 2025

(51) Int. Cl.
    *G01M 17/00*     (2006.01)
    *G01M 99/00*     (2011.01)
    (Continued)

(52) U.S. Cl.
    CPC .......... *G01M 99/005* (2013.01); *G01M 17/00* (2013.01); *G05B 13/04* (2013.01); *G07C 5/0808* (2013.01)

(58) Field of Classification Search
None
See application file for complete search history.

(56) References Cited

U.S. PATENT DOCUMENTS 10,949,553 B1   3/2021  Kowalick
11,662,271 B1 *  5/2023  Dong .................. G01M 17/007
                             73/118.01

(Continued)

FOREIGN PATENT DOCUMENTS

CN      205015940 U    2/2016
CN      105719364 A    6/2016

(Continued)

OTHER PUBLICATIONS

TW OA issued on Apr. 21, 2025.

(Continued)

*Primary Examiner* — Suman K Nath
(74) *Attorney, Agent, or Firm* — WPAT, PC

(57) ABSTRACT

A method for event data recorder testing and an apparatus thereof are disclosed. The method includes: (a) preparing an event data recorder testing apparatus and planning test conditions; (b) calculating to obtain the next subsequent test condition information; (c) converting movement speed of the event data recorder and storing the movement speed as a simulation result; (d) setting a rotating angle of a rotating platform, a pivot angle of a frame and pressure of the air ejected from a nozzle according to the simulation result, respectively; (e) performing a simulation test on the event data recorder testing apparatus according to the settings, and driving the nozzle to eject the air to generate thrust on the event data recorder; (f) obtaining and storing the action information of the event data recorder, and recording simulation result of the operation process; and (g) generating a test report.

14 Claims, 6 Drawing Sheets

(51) Int. Cl.
  *G05B 13/04*  (2006.01)
  *G07C 5/08*  (2006.01)

(56) References Cited

U.S. PATENT DOCUMENTS

| | | | |
|---|---|---|---|
| 11,821,877 B2 | 11/2023 | Lim et al. | |
| 2011/0238258 A1* | 9/2011 | Singh | G07C 5/0808 |
| | | | 703/2 |
| 2013/0036405 A1* | 2/2013 | Verbest | G06F 11/3672 |
| | | | 702/117 |
| 2017/0365112 A1* | 12/2017 | Daily | G07C 5/0841 |

FOREIGN PATENT DOCUMENTS

| | | |
|---|---|---|
| CN | 207387647 U | 5/2018 |
| CN | 209326996 U | 8/2019 |
| CN | 112362284 A | 2/2021 |
| CN | 112857823 A | 5/2021 |
| CN | 213586083 U | 6/2021 |
| CN | 213714674 U | 7/2021 |
| CN | 113567147 A | 10/2021 |
| CN | 214503787 U | 10/2021 |
| CN | 216349589 U | 4/2022 |
| CN | 114739691 A | 7/2022 |
| CN | 216899535 U | 7/2022 |
| CN | 115980391 A | 4/2023 |
| CN | 116339283 A | 6/2023 |
| CN | 116539323 A | 8/2023 |
| JP | 2011-238134 A | 11/2011 |
| KR | 20220065467 A | 5/2022 |
| TW | 201944271 A | 11/2019 |

OTHER PUBLICATIONS

Miguel Tabone et al., Emulation of Vehicle Speed and Impact on Vehicle Event Data Recorder (Published on Jan. 2019), IEEE Xplore.

Andreas Klausen et al., Mathematical modeling and optimization of a vehicle crash test based on a single-mass, Proceeding of the 11th World Congress on Intelligent Control and Automation Shenyang, China, Jun. 29-Jul. 4, 2014.

Su Man Nam et al., A Vehicle Crash Simulator Using Digital Twin Technology for Synthesizing Simulation and Graphical Models, Published: Aug. 28, 2023, Vehicles 2023.

Miguel Tabone et al . . . , Synchronization of Event Data Recorder (EDR) Data to Data from the CAN Bus and LabVIEW in emulated non deployment and deployment laboratory experiments, 2020 6th International Conference on Mechatronics and Robotics Engineering.

N Takubo et al., Evaluation of Event Data Recorder Based on Crash Tests (Published on Feb. 2010), National Research Institute of Police Science, Department of Traffic Science.

* cited by examiner

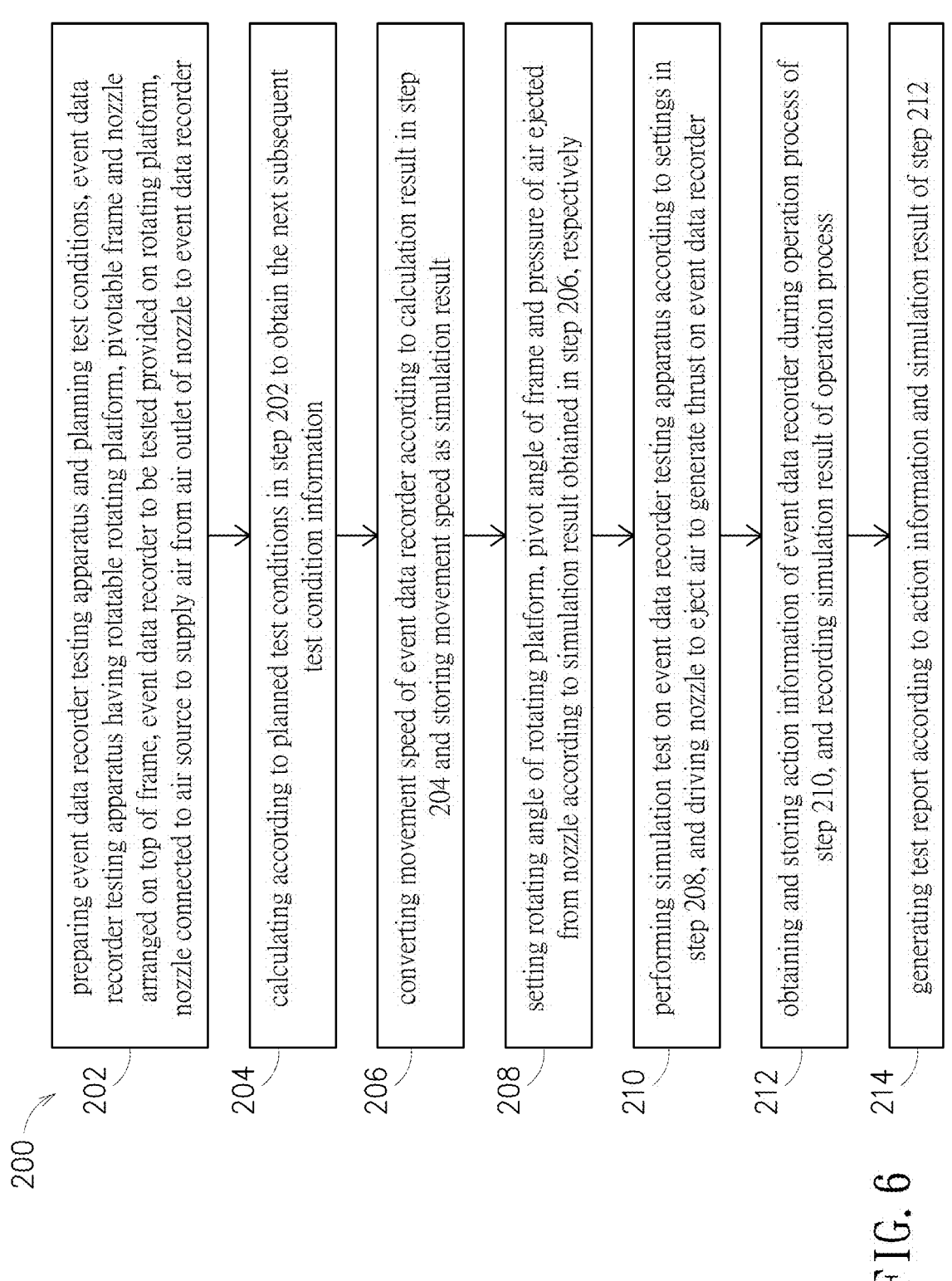

202 preparing event data recorder testing apparatus and planning test conditions, event data recorder testing apparatus having rotatable rotating platform, pivotable frame and nozzle arranged on top of frame, event data recorder to be tested provided on rotating platform, nozzle connected to air source to supply air from air outlet of nozzle to event data recorder 204 calculating according to planned test conditions in step 202 to obtain the next subsequent test condition information 206 converting movement speed of event data recorder according to calculation result in step 204 and storing movement speed as simulation result 208 setting rotating angle of rotating platform, pivot angle of frame and pressure of air ejected from nozzle according to simulation result obtained in step 206, respectively 210 performing simulation test on event data recorder testing apparatus according to settings in step 208, and driving nozzle to eject air to generate thrust on event data recorder 212 obtaining and storing action information of event data recorder during operation process of step 210, and recording simulation result of operation process 214 generating test report according to action information and simulation result of step 212

METHOD FOR EVENT DATA RECORDER TESTING AND APPARATUS THEREOF

TECHNICAL FIELD

The present disclosure relates to the field of testing technology, and more particularly to a method for event data recorder testing and an apparatus thereof.

BACKGROUND

Event data recorder (EDR) (also known as automobile event data recorder, event recording device) is commonly used on vehicles, and is mainly used to record images when the vehicle suffers accidents such as collisions and over-turns. At the same time, it can be combined with the Global Positioning System (GPS) to record the vehicle's geographical location.

In order to ensure the function of the event data recorder, it must be tested before mass production or leaving the factory.

The traditional method of installing an event data recorder on a real vehicle to perform a crash test on a real vehicle is too costly. Therefore, industry professionals have devised various testing machines, where the event data recorder is installed on the machine, and then triggered through different methods, capable of simulating a real vehicle collision or overturn, thereby testing the recording function of the event data recorder.

The triggering mechanism of this type of conventional testing machine mainly includes: composed of a magnetic axis, a linear motor, and a slide rail; composed a spring, a support frame, and a slide rail; composed of a pendulum impact system and an impact bench; composed of a spring, an electric telescopic rod and a vibrating plate; and, using the actual speed change value of the pulley to generate trigger conditions.

However, the shortcoming of the conventional test machines is that, limited by the structure of the test platform, they can often only do one-way acceleration tests on the event data recorder, or can only do overturn tests, or can only do tilt tests, and cannot test the event data recorder from all angles.

In addition, the structures of conventional test machines are complicated, causing the machine to be large in volume, to be high in cost, and to occupy space.

In addition, it is known that the trigger value driven by conventional mechanical combination is not very accurate and must be calibrated frequently, which is time-consuming and labor-intensive.

Accordingly, how to develop "a method for event data recorder testing and ab apparatus thereof" that can accurately control the trigger value, provide triggering at any angle, without damaging the event data recorder, and has a small device size is an urgent issue that needs to be solved by people in related technical fields.

SUMMARY

In an embodiment, the present disclosure proposes a method for event data recorder testing, including the following steps: (a) preparing an event data recorder testing apparatus and planning test conditions, the event data recorder testing apparatus having a rotatable rotating platform, a pivotable frame and a nozzle arranged on the top of the frame, the event data recorder to be tested provided on the rotating platform, the nozzle connected to an air source to supply air from an air outlet of the nozzle to the event data recorder; (b) calculating according to the planned test conditions in step (a) to obtain the next subsequent test condition information; (c) converting movement speed of the event data recorder according to the calculation result in step (b) and storing the movement speed as a simulation result; (d) setting a rotating angle of the rotating platform, a pivot angle of the frame and pressure of the air ejected from the nozzle according to the simulation result obtained in step (c), respectively; (e) performing a simulation test on the event data recorder testing apparatus according to the settings in step (d), and driving the nozzle to eject the air to generate thrust on the event data recorder; (f) obtaining and storing the action information of the event data recorder during the operation process of step (e), and recording simulation result of the operation process; and (g) generating a test report according to the action information and the simulation result of step (f).

In an embodiment, the present disclosure proposes an event data recorder testing apparatus, including: a base, having a slide rail, a length direction of the base parallel to a Z-axis; a rotating platform, including: a pedestal, provided on the slide rail of the base and capable of being slid parallel to the Z-axis on the slide rail; and a bearing table, provided on the base to carry an event data recorder and capable of being moved synchronously with the base, the bearing table in connection with a rotation mechanism, the rotation mechanism used to drive the bearing table to rotate parallel to a XZ plane on the base, and the XZ plane formed by an X-axis and the Z-axis; a frame, spanning over the rotating platform, the frame having a pivot axis, the pivot axis parallel to the X-axis, the frame in connection with a pivot mechanism, the pivot mechanism used to drive the frame to take the pivot axis as a center to pivot, allowing a top of the frame to be swung in a fan shape above the rotating platform; and a nozzle, provided on the top of the frame, the nozzle having an air outlet facing the event data recorder positioned on the rotating platform, the nozzle in connection with an air source, and the air source used to supply air to eject from the outlet; when the air ejected from the nozzle generates a thrust parallel to the Z-axis on the event data recorder, the rotating platform and the event data recorder capable of being synchronously slid parallel to the Z-axis on the slide rail.

BRIEF DESCRIPTION OF THE DRA WINGS

FIG. 6 is a flow chart of an embodiment of a method for event data recorder testing of the present disclosure.

Figure 1:
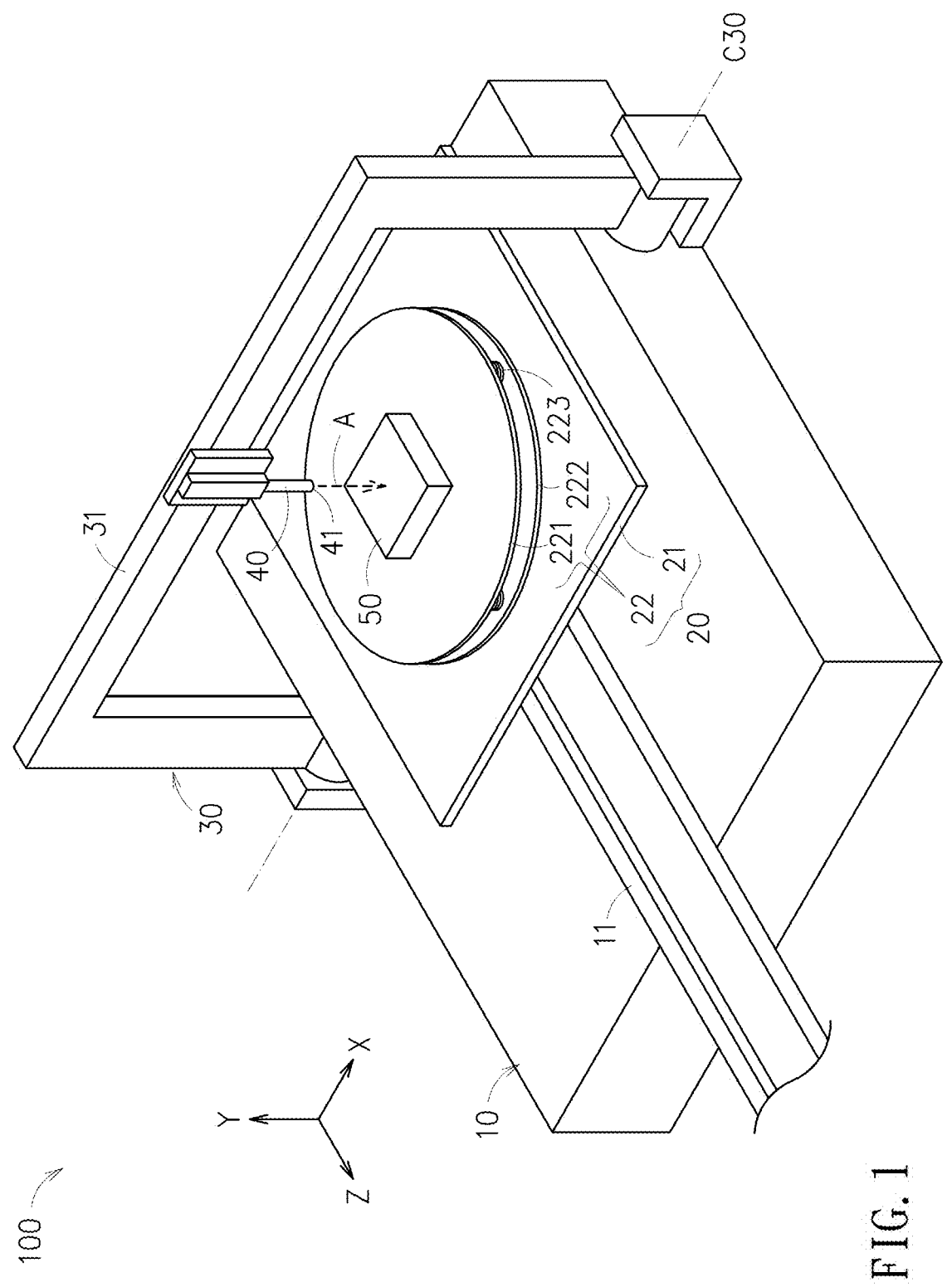
FIG. 1 is a perspective view of a structure of an embodiment of an event data recorder testing apparatus of the present disclosure.

DETAILED DESCRIPTION referring to FIG. 1, an event data recorder testing apparatus 100 of the present disclosure, in an embodiment, includes a base 10, a rotating platform 20, a frame 30 and a nozzle 40.

The base 10 has a slide rail 11, the length direction of which is parallel to Z-axis. The lengths of the base 10 and the slide rail 11 along X-axis direction are designed according to the actual requirements.

Figure 2:
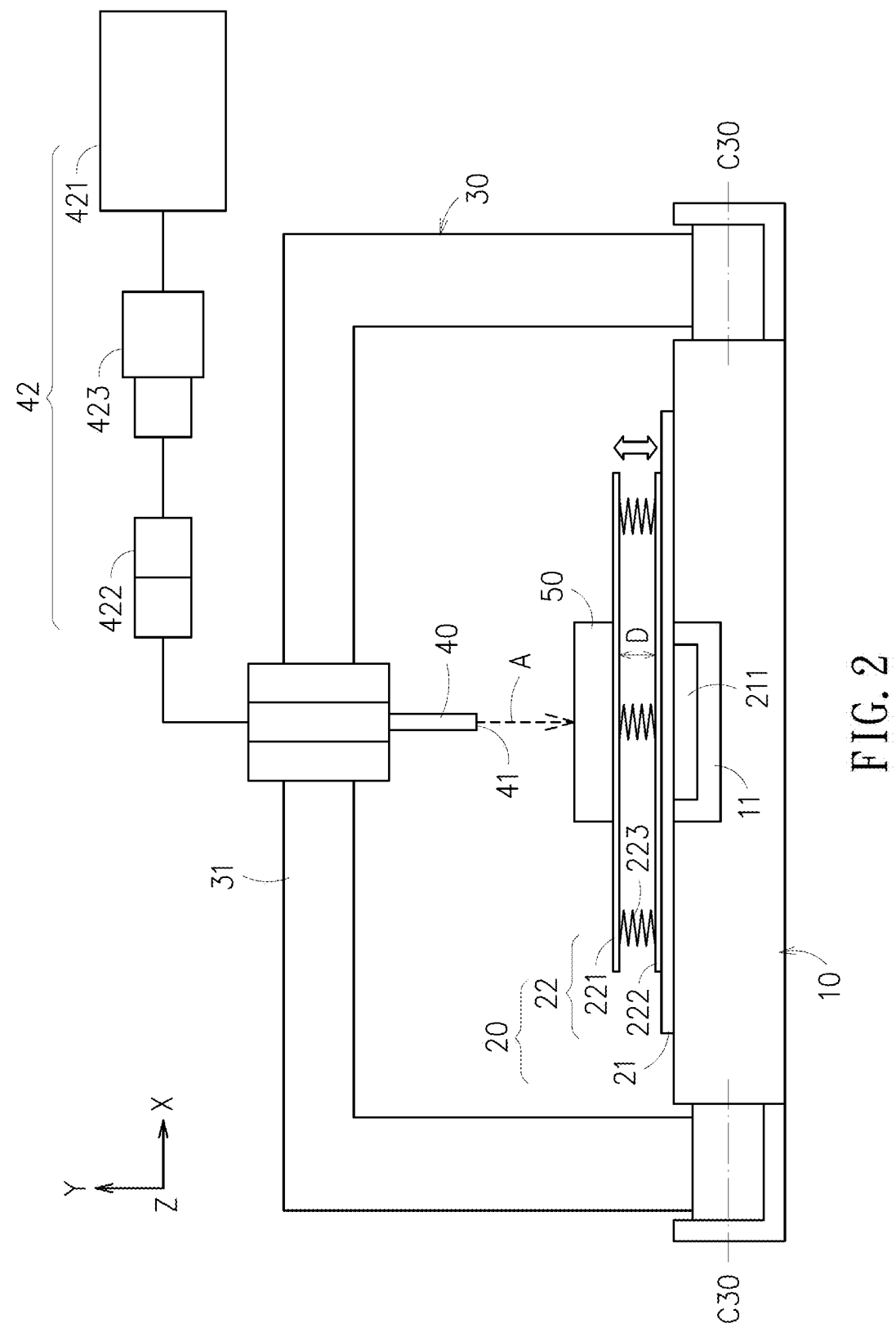
FIG. 2 is an enlarged front view of a part of structure of the embodiment of FIG. 1.

Referring to FIGS. 1 and 2, the rotating platform 20 includes a pedestal 21 and a bearing table 22.

The pedestal 21 is provided on the slide rail 11 of the base 10, a slide block 211 is provided on the bottom of the pedestal 21, the pedestal 21 is provided on the base 10, the slide block 21 is embed in the slide rail 11, the pedestal can be slid on the slide rail 11 through the slide block 211, and the shape of the pedestal 21 is not limited to the shape shown in the figures and can be any geometrical shape.

It must be noted that the combination manner of the slide block 211 and the slide rail 11 is only an example, besides, a pulley and a slide rail, or a pneumatic cylinder or a hydraulic cylinder may also be used to achieve the purpose of sliding the pedestal 21 parallel to the Z-axis direction.

The bearing table 22 includes a top plate 221, a bottom plate 222 and a plurality of elastic elements 223.

The top of the top plate 221 can carry the event data recorder 50. The event data recorder 50 must be fixedly provided on the top plate 221, for example, can be locked with bolts, or can be hooked with snaps, no limitation on the method.

The shape of the top plate 221 is not limited to the circular shape shown in the figures, and can be any geometrical shape; the event data recorder 50 can be provided on any position of the top plate 221, not limited the exact center shown in the figures.

The bottom plate 222 is provided below the top plate 221, and there is a distance D between the top plate 221 and the bottom plate 222.

The elastic elements 223 are provided between the top plate 221 and the bottom plate 222. The elastic direction F of each of the elastic elements 223 is parallel to Y-axis.

The bearing table 22 is provided on the pedestal 21 and can be moved synchronously with the base 21.

The bearing table 22 is connected to a rotation mechanism (not shown in the figures) and driven by the rotation mechanism to rotate parallel to an XZ plane on the pedestal 21, and the XZ plane is formed by X-axis and Z-axis perpendicular to each other. The X-axis, Z-axis and Y-axis are three axes perpendicular to one another.

Regarding the rotation mechanism, for example, it can be formed through gears, racks and motors, the gears or the racks are provided between the pedestal 21 and the base 10, and the pedestal 21 can be driven to rotate after the gears or the racks are driven by the motors. In other words, there are no restrictions on the composition of the rotation mechanism, the bearing table 22 capable of being driven to rotate parallel to the XZ plane is enough, and it can be designed according to actual needs.

Figure 3:
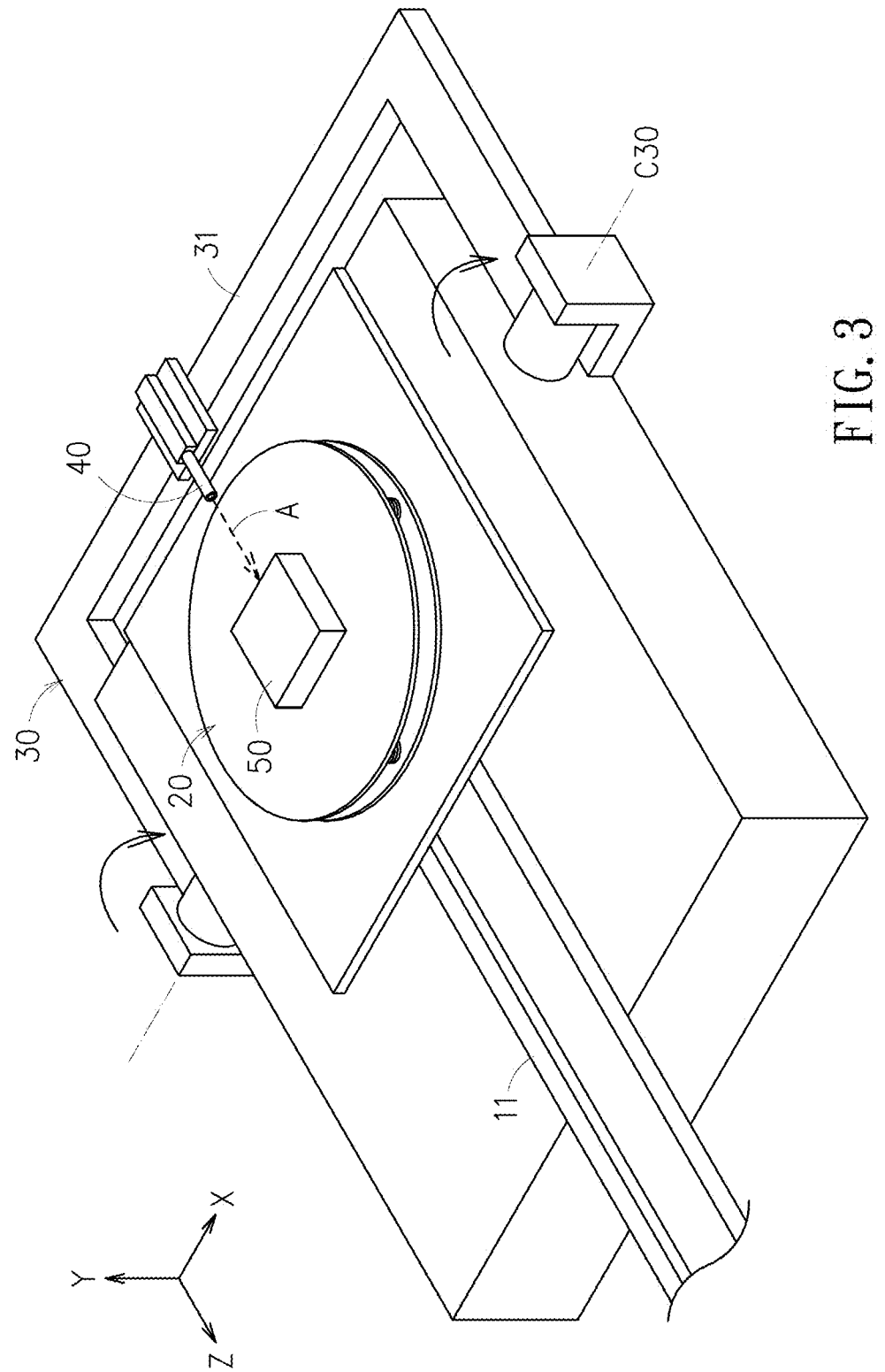
FIG. 3 is a perspective view of a structure of a frame pivoted to a different angle of the embodiment of FIG. 1.

Referring to FIGS. 1 and 3, the frame 30 spans over the rotating platform 20, and has a pivot axis C30 parallel to X-axis.

The frame 30 is connected to a pivot mechanism (not shown in the figures), the pivot mechanism drives the frame 30 to take the pivot axis C30 as a center to pivot, the top 31 of the frame 30 swings in a fan shape above the rotating platform 20, for example, the top 31 of the frame 30 shown in FIG. 1 is positioned exactly above the rotating platform 20, and the top 31 of the frame 30 shown in FIG. 3 is pivotally swung to the rear side of the rotating platform 20.

The shape of the frame 30 is not limited to the shape shown in the figures, and can also be a round-ring shape or any geometrical shape, designed according to actual space and needs.

Regarding the pivot mechanism, for example, it can be formed through gears, racks and motors, the gears or the racks are provided between the frame 30 and the base 10, and the frame 30 can be driven to pivot after the gears or racks are driven by the motors. In other words, there is no restriction on the composition of the pivot mechanism, the frame 30 capable of being driven to pivot around the pivot axis C30 is enough, and it is designed according to actual needs.

Referring to FIGS. 1 and 2, the nozzle 40 is provided on the top 31 of the frame 30. The nozzle 40 has an air outlet 41 facing the event data recorder 50 positioned on the rotating platform 20.

Referring to FIG. 2, the nozzle 40 is connected to an air source 42, and air A is provided by the air source 42 and ejected from the air outlet 41.

The composition of the air source 42, for example, includes an air pump 421, a solenoid valve 422 and a proportional valve 423. The air pump 421 is used to provide air A. The solenoid valve 422 controls to open or close the output of the air A of the air pump 421. The proportional valve 423 is used to control the magnitude of the air pressure formed when the air A is sprayed out from the nozzle 40.

Referring to FIGS. 1 and 2, the frame 30 spans exactly above the rotating platform 20, and the nozzle 40 can generate a push force parallel to the Y-axis on the event data recorder 50, and compress the elastic elements 223 at the same time. The compression and resilience generated by the elastic elements 223 can provide the top plate 221 with buffering elasticity parallel to the Y-axis relative to the bottom plate 222.

Figure 4:
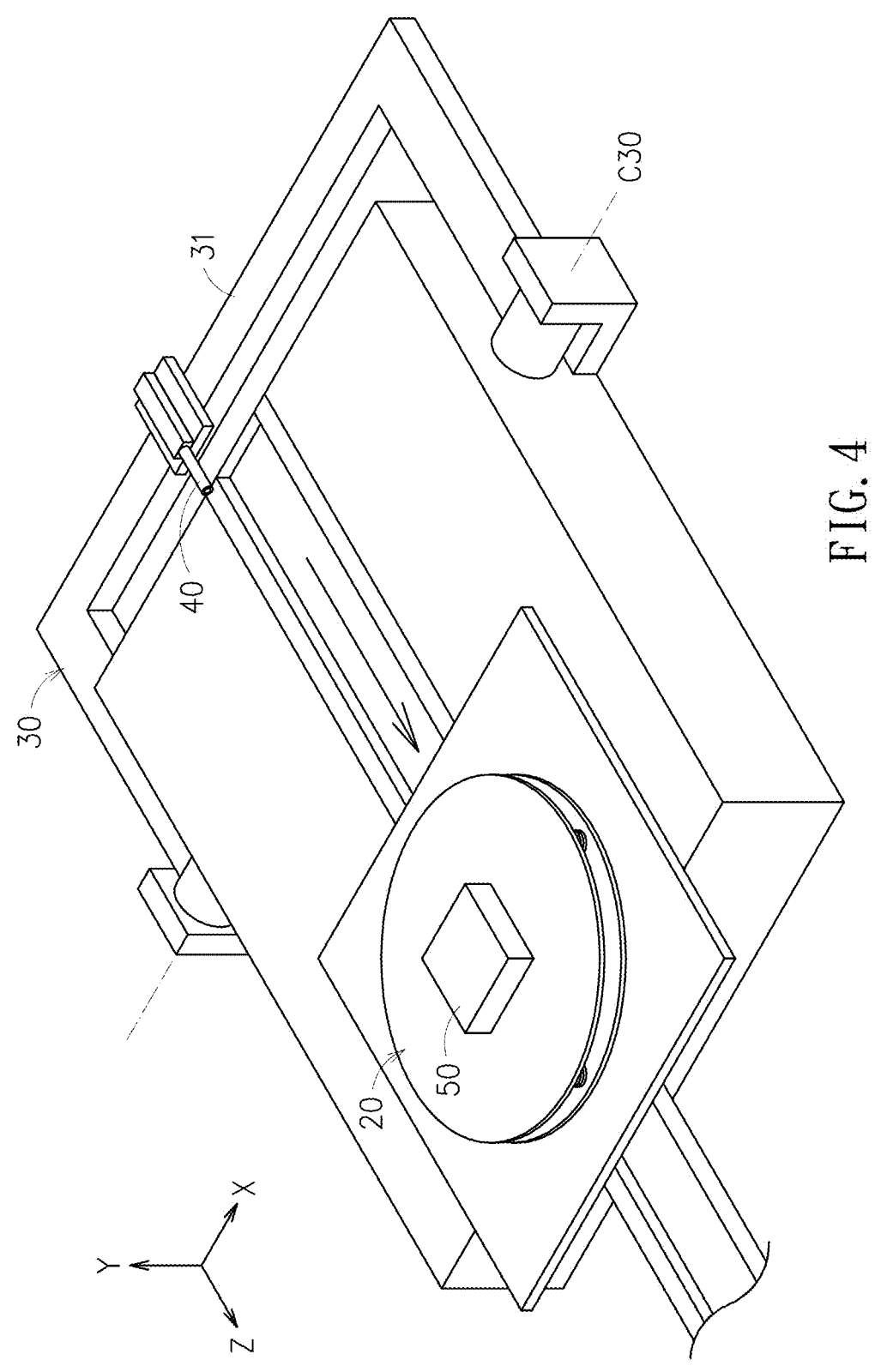
FIG. 4 is a perspective view of a structure of a rotating platform moved along a rail of the embodiment of FIG. 1.

Referring to FIGS. 3 and 4, the frame 30 takes the pivot axis C30 as a center to pivotally swing approximately 90 degrees to the rear side of the rotating platform 20, when the nozzle 40 ejects the air A, it can generate a push force parallel to Z-axis on the event data recorder 50, capable of pushing the rotating platform 20 to slide on the slide rail 11 parallel to the Z-axis.

Depending on the magnitude of the air pressure formed when the air A is ejected from the nozzle 40, the sliding distance of the rotating platform 20 on the slide rail 11 will also be different.

Figure 5:
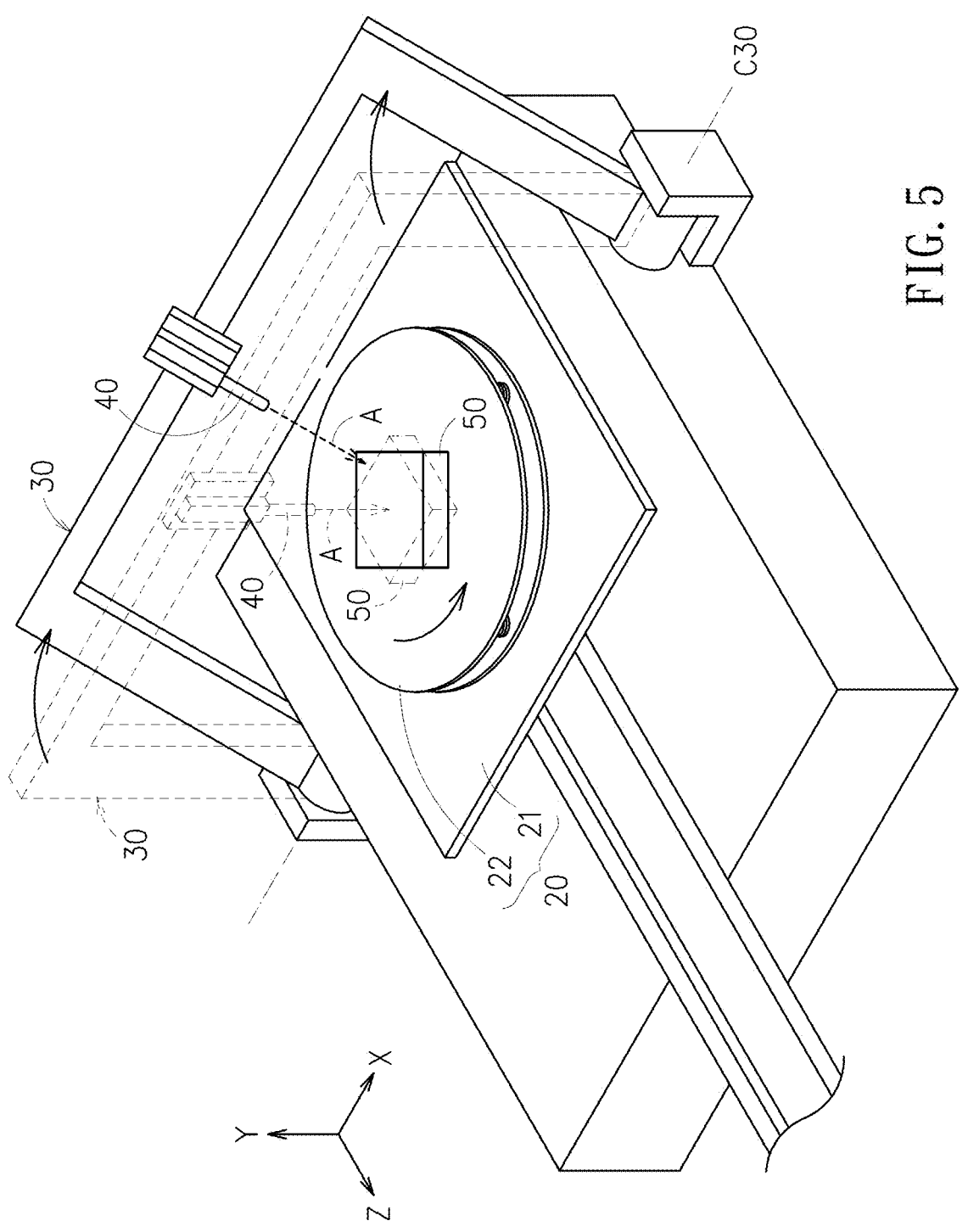
FIG. 5 is a schematically perspective view of the state of the rotation of a bearing table matching with the pivot of a frame of the embodiment of FIG. 1.

Referring to FIG. 5, the bearing table 22 is rotated approximately 45 degrees parallel to the XZ plane on the pedestal 21 to drive the event data recorder 50 synchronously to rotate 45 degrees; the frame 30 takes the pivot axis C30 as a center to pivotally swing approximately 45 degrees to the inclined rear side of the rotating platform 20. In this state, the position that the nozzle 40 the nozzle 40 ejects the air A to the event data recorder 50 can be changed. By analogy, the rotatable bearing table 22 is used in conjunction with the reversible frame 30 so that the nozzle 40 provided on the frame 30 and the event data recorder 50 provided on the bearing table 22 exhibit different relative angle relationships.

The angle at which the frame 30 pivots and swings with the pivot axis C30 as the center is not limited. As shown in the figure, the frame 30 swings backward about 90 degrees. Cooperating with the rotation of the bearing table 22 360 degrees, a hemispherical test range can be formed for the event data recorder 50; if necessary, the placement state of the event data recorder 50 can be changed, for example, placing it sideways or bottom up, so that the event data recorder 50 can be tested globally at any angle.

Referring to FIG. 6, a process 200 of a method for an event data recorder testing includes the following steps 202 to 214, referring to FIG. 1 at the same time.

Step 202: prepare an event data recorder testing apparatus 100 and plan test conditions. The event data recorder testing apparatus 100 has a rotatable rotating platform 20, a pivotable frame 30 and a nozzle 40 arranged on the top of the frame 30. The event data recorder 50 to be tested is provided on the rotating platform 20. The nozzle 40 is connected to the air source 42 to supply the air A from the air outlet 41 of the nozzle 40 to the event data recorder 50.

Among them, the planned test conditions include vehicle specifications, the installation location of the event data recorder 50, and the relative position and collision conditions of the collision target.

Step 204: calculate according to the planned test conditions in the step 202 to obtain the next subsequent test condition information.

Step 206: convert the movement speed of the event data recorder according to the calculation result in step 204 and store it as a simulation result, where the movement speed specifically refers to the movement speed of the event data recorder 50 relative to the position of the center of mass after testing.

Upon the actual vehicle collision, the corresponding rotation will further be generated besides the offset, so that the angle velocity of the vehicle must be considered at the same time. Therefore, for example, the calculation method shown below can be used as an example.

Suppose the offset vector of the event data recorder 50 relative to the center of mass is as follows:

$$r_{offset} = [x_{offset}, y_{offset}, z_{offset}]$$

The angular velocity of the object is as follows:

$$\omega = [\omega_x, \omega_y, \omega_z]$$

The velocity vector of the event data recorder 50 position is as follows:

$$V_{offset} = r_{offset} \times \omega = \begin{bmatrix} y_{offset} \cdot \omega_z - z_{offset} \cdot \omega_y \\ z_{offset} \cdot \omega_x - x_{offset} \cdot \omega_z \\ x_{offset} \cdot \omega_y - y_{offset} \cdot \omega_x \end{bmatrix}$$

Next, calculate the force required by the event data recorder 50 according to the speed of movement, and use Newton's second law to perform reverse inference, as follows:

$$F_x = m \cdot \frac{v_{2x}}{\Delta t}$$

$$F_y = m \cdot \frac{v_{2y}}{\Delta t}$$

$$F_z = m \cdot \frac{v_{2z}}{\Delta t}$$

Among them, the Y-axis must additionally consider spring force and gravity, therefore:

$$F_{total\_Y} = F_{spring} + F_{gravity} + F_y$$

Finally, calculate the resultant force:

$$|F_{total}| = \sqrt{F_x^2 + F_{total\_Y}^2 + F_z^2}$$

Step 208: respectively set the rotating angle of the rotating platform 20, the pivot angle of the frame 30 and the pressure of the air A ejected from the nozzle 40 according to the simulation result obtained in the step 206.

If the simulation result stored in the step 206 is 3D coordinates, they must be converted to spherical coordinates, and thereafter, respectively set the rotating angle of the rotating platform 20, the pivot angle of the frame 30 and the pressure of the air A ejected from the nozzle 40 according to the spherical coordinates in the step 208.

The calculation method for converting three-dimensional coordinates into spherical coordinates is as shown below.

The radial vector of the coordinates is calculated as follows:

$$r = \sqrt{F_x^2 + F_{total\_Y}^2 + F_z^2}$$

The calculation method of polar angle (θ) is as follows:

$$\theta = \arccos\left(\frac{F_{total\_Y}}{\sqrt{F_x^2 + F_{total\_Y}^2 + F_z^2}}\right)$$

The calculation method of azimuth angle (φ) is as follows:

$$\phi = \arctan\left(\frac{F_z}{F_x}\right)$$

Step 210: perform a simulation test on the event data recorder testing apparatus 100 according to the settings in the step 208, and drive the nozzle 40 to eject the air A to generate thrust on the event data recorder 50.

Step 212: obtain and store the action information of the event data recorder 50 during the operation process of the step 210, and record the simulation result of the operation process.

Step 214: The action information and the simulation result obtained in the step 212 may be analyzed first to see if they meet the requirements, and then generate a test report according to the analysis result in the step 214.

In summary, the event data recorder testing method and testing equipment provided by the present disclosure utilize the rotatable bearing table operated in coordination with the reversible frame, so that the nozzle provided on the frame and the event data recorder provided on the bearing table present different relative angle relationships, capable of accurately controlling the trigger value, providing triggering at any angle, and not damaging the event data recorder, and the overall apparatus is small in size and not occupy a lot of space.

Although the present disclosure has been disclosed as above in the form of embodiments, it is not intended to limit the present disclosure. Anyone with ordinary knowledge in the technical field can make some changes and modifications without departing from the spirit and scope of the present disclosure, so the scope of protection of the present disclosure shall be subject to the scope of the appended claims.

What is claimed is:

1. A method for event data recorder testing, comprising the following steps:

(a) preparing an event data recorder testing apparatus and planning test conditions, said event data recorder testing apparatus having a rotatable rotating platform, a pivotable frame and a nozzle arranged on the top of said frame, said event data recorder to be tested provided on said rotating platform, said nozzle connected to an air source to supply air from an air outlet of said nozzle to said event data recorder;

(b) calculating according to said planned test conditions in step (a) to obtain the next subsequent test condition information;

(c) converting movement speed of said event data recorder according to the calculation result in step (b) and storing said movement speed as a simulation result;

(d) setting a rotating angle of said rotating platform, a pivot angle of the frame and pressure of said air ejected from said nozzle according to said simulation result obtained in step (c), respectively;

(e) performing a simulation test on said event data recorder testing apparatus according to said settings in step (d), and driving said nozzle to eject said air to generate thrust on said event data recorder;

(f) obtaining and storing said action information of said event data recorder during the operation process of step (e), and recording simulation result of said operation process; and (g) generating a test report according to said action information and said simulation result of step (f).

2. The method according to claim 1, wherein said test conditions planned in said step (a) comprises vehicle specifications, event data recorder installation location, and a relative position and collision conditions of a collision target.

3. The method according to claim 1, wherein said step (c) is converting said movement speed relative to a position of mass center after said event data recorder is tested.

4. The method according to claim 1, wherein said simulation result stored in said step (c) is first converted from three-dimensional coordinates to spherical coordinates, and then in said step (d), said rotation angle of said rotating platform, said pivot angle of said frame and said pressure of said air ejected from said nozzle are respectively set according to said spherical coordinates.

5. The method according to claim 1, wherein said action information and said simulation result obtained in said step (f) are analyzed to see whether they meet the requirements, and then said test report is generated based on said analysis results in said step (g).

6. The method according to claim 1, wherein said event data recorder testing apparatus comprises:

a base, having a slide rail, a length direction of said base parallel to a Z-axis;

said rotating platform, comprising:

a pedestal, provided on said slide rail of said base and capable of being slid parallel to said Z-axis on said slide rail; and a bearing table, provided on said base to carry an event data recorder and capable of being moved synchronously with said base, said bearing table in connection with a rotation mechanism, said rotation mechanism used to drive said bearing table to rotate parallel to a XZ plane on said base, and said XZ plane formed by an X-axis and said Z-axis;

said frame, spanning over said rotating platform, said frame having a pivot axis, said pivot axis parallel to said X-axis, said frame in connection with a pivot mechanism, said pivot mechanism used to drive said frame to take said pivot axis as a center to pivot, allowing a top of said frame to be swung in a fan shape above said rotating platform; and said nozzle, provided on said top of said frame, said nozzle having an air outlet facing said event data recorder positioned on said rotating platform, said nozzle in connection with an air source, and said air source used to supply air to eject from said outlet.

7. The method according to claim 6, wherein in said step (e), when said air ejected from said nozzle generates a thrust parallel to said Z-axis on said event data recorder, said rotating platform and said event data recorder is capable of being synchronously slid parallel to said Z-axis on said slide rail.

8. The method according to claim 1, wherein said bearing table comprises:

a top plate, a top thereof carrying said event data recorder;

a bottom plate, provided below said top plate, said top plate and said bottom plate spaced a distance; and a plurality of elastic elements provided between said top plate and said bottom plate, an elastic direction of each of said elastic elements parallel to a Y-axis, and said X-axis, said Z-axis and said Y-axis being three axes perpendicular to one another.

9. The method according to claim 8, wherein in step (e), when said air ejected from said nozzle generates a thrust parallel to said Y-axis on said event data recorder, said plurality of elastic elements provide said top plate with buffering elasticity parallel to said Y-axis relative to said bottom plate.

10. The method according to claim 1, wherein said air source comprises:

an air pump, providing air;

a solenoid valve, controlling opening or closing the output of said air; and a proportional valve, controlling the magnitude of air pressure formed when said air is ejected from said nozzle.

11. An event data recorder testing apparatus, comprising:

a base, having a slide rail, a length direction of said base parallel to a Z-axis;

a rotating platform, comprising:

a pedestal, provided on said slide rail of said base and capable of being slid parallel to said Z-axis on said slide rail; and a bearing table, provided on said base to carry an event data recorder and capable of being moved synchronously with said base, said bearing table in connection with a rotation mechanism, said rotation mechanism used to drive said bearing table to rotate parallel to a XZ plane on said base, and said XZ plane formed by an X-axis and said Z-axis;

a frame, spanning over said rotating platform, said frame having a pivot axis, said pivot axis parallel to said X-axis, said frame in connection with a pivot mechanism, said pivot mechanism used to drive said frame to take said pivot axis as a center to pivot, allowing a top of said frame to be swung in a fan shape above said rotating platform; and a nozzle, provided on said top of said frame, said nozzle having an air outlet facing said event data recorder positioned on said rotating platform, said nozzle in connection with an air source, and said air source used to supply air to eject from said outlet;

when said air ejected from said nozzle generates a thrust parallel to said Z-axis on said event data recorder, said rotating platform and said event data recorder capable of being synchronously slid parallel to said Z-axis on said slide rail.

12. The apparatus according to claim 11, wherein said bearing table comprises:

a top plate, a top thereof carrying said event data recorder;

a bottom plate, provided below said top plate, said top plate and said bottom plate spaced a distance; and a plurality of elastic elements provided between said top plate and said bottom plate, an elastic direction of each of said elastic elements parallel to a Y-axis, and said X-axis, said Z-axis and said Y-axis being three axes perpendicular to one another; when said air ejected from said nozzle generates a thrust parallel to said Y-axis on said event data recorder, said plurality of elastic elements providing said top plate with buffering elasticity parallel to said Y-axis relative to said bottom plate.

13. The apparatus according to claim 11, wherein said air source comprises:

an air pump, providing air;

a solenoid valve, controlling opening or closing the output of said air; and a proportional valve, controlling the magnitude of air pressure formed when said air is ejected from said nozzle.

14. The apparatus according to claim 11, wherein a bottom of said pedestal is provided with a slide block, said pedestal is provided on said base, said slide block is embedded in said slide rail, and said pedestal is capable of being slid parallel to said Z-axis on said slide rail through said slide block.

\* \* \* \* \*